United States Patent [19]

Nydes

[11] Patent Number: 4,596,450
[45] Date of Patent: Jun. 24, 1986

[54] GRAVITY OPENING PROTECTIVE DEVICE FOR SCOPE LENS

[76] Inventor: Raymond J. Nydes, 224 Hemlock Pl., Lower Burrell, Pa. 15068

[21] Appl. No.: 599,461

[22] Filed: Apr. 12, 1984

[51] Int. Cl.⁴ ............................................. G02B 00/00
[52] U.S. Cl. .................................................. 350/587
[58] Field of Search ............... 350/315, 319, 579, 580, 350/581, 587

[56] References Cited

U.S. PATENT DOCUMENTS

| | | | |
|---|---|---|---|
| 1,632,679 | 8/1926 | Rhodes | 350/580 |
| 2,522,897 | 8/1947 | Rotter | 350/587 |
| 3,399,011 | 4/1965 | Heiniger | 350/581 |

*Primary Examiner*—John K. Corbin
*Assistant Examiner*—Vincent J. Lemmo
*Attorney, Agent, or Firm*—James Irwin

[57] ABSTRACT

A self-opening lens protective device for protecting the lens of a scope mounted on a gun is disclosed. The lens protective device is comprised of a tubular sleeve member having a first end thereof adapted for mounting on an end of a scope and having a second end for mounting a cover member thereto. Relative to the barrel of the gun when the protective device is placed on a scope attached to a gun, the tubular member has a top portion furtherest away from the gun barrel and a bottom portion closest to the gun barrel. A cover member is pivotally connected to the second end at the bottom portion of the tubular member and is adapted to open by gravity when the gun is brought to the firing position.

7 Claims, 5 Drawing Figures

GRAVITY OPENING PROTECTIVE DEVICE FOR SCOPE LENS

INTRODUCTION

This invention relates to a scope lens and more particularly it relates to a protective device for the lens of a gun scope.

In hunting using a rifle and scope, it is common to encounter inclement weather. As a result, water drops or the likes can get on the lens which greatly impedes the operator's use of the scope. Numerous mechanisms have been proposed to remedy such problems with the scope but usually the mechanisms are very complicated and require an extra operation of a lever such as pushing or pulling. The operation of such a lever can be accompanied with clicking noises which, of course, is not helpful when stalking game. A typical mechanized cover assembly is disclosed in U.S. Pat. No. 3,496,642 where shields are pivoted for swinging movement from closed lens protective positions to open lens exposing position. A biasing means is provided for holding the shields in a closed position. A release mechanism is provided to release a biasing means, e.g. spring, to permit the shields to open. U.S. Pat. No. 2,738,585 discloses another scope covering device having an operating mechanism which has to be activated to uncover the lens before the scope can be used. U.S. Pat. No. 2,782,510 discloses yet another mechanism wherein a manually operated cable is pushed or pulled to remove lens protectors prior to the scope being used.

A relatively simple device that is often used to protect lens covers is a cap or shield which has a simple friction fit. However, again, such device requires the extra operation of removing the cap prior to using the scope. Thus, it can be seen that there is a great need for a protective lens cover which does not require additional steps or operations to uncover the lens prior to firing the gun. The present invention provides a protective shield which does not require additional manipulative steps by the gun operator to uncover the lens prior to firing and accordingly provides a fail safe mechanism which does not require the operator to remember to uncover the lens in the excitement of hunting.

SUMMARY OF THE INVENTION

It is an object of the present invention to provide a protective cover for a scope.

It is another object of the present invention to provide a protective cover for a scope lens which does not require extra steps by the operator of the gun to uncover the lens.

It is yet another object of the present invention to provide a protective cover for a gun scope which is activated to uncover the lens when the gun is brought to the firing position.

These and other objects will become apparent from the specification, claims and drawings appended hereto.

In accordance with these objects, there is provided a self-opening protective device for protecting the lens of a scope mounted on a gun. The protective device is comprised of a tubular sleeve member having a first end thereof adapted for mounting on one end of a scope and having a second end thereof for mounting a cover member thereon. The sleeve member also includes an upper portion and a bottom portion with the bottom portion located closest to the gun barrel and the top portion located furtherest from the gun barrel when the scope is mounted on the gun. A cover member is pivotally connected to the second end of the sleeve member at the bottom portion so that the cover opens by gravity or is self-opening upon bringing the gun to the firing position.

DETAILED DESCRIPTION OF THE PREFERRED EMBODIMENTS

Figure 1:
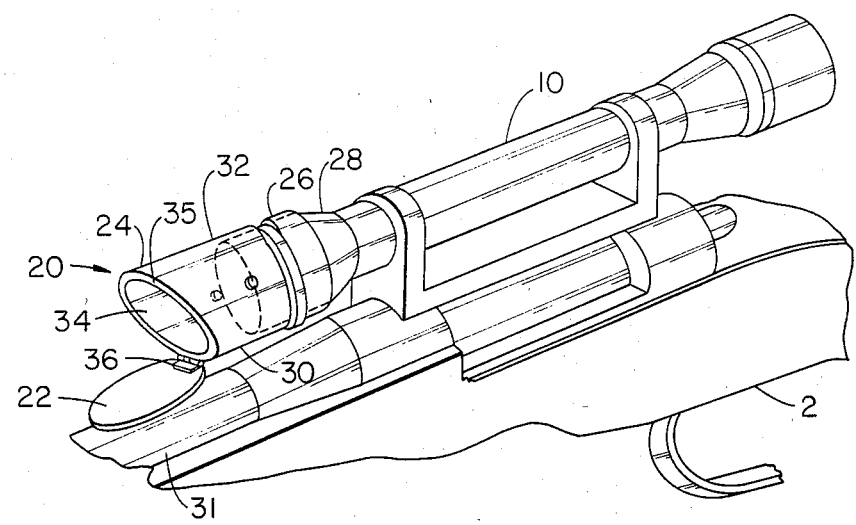
FIG. 1 is a perspective view of a scope mounted on a gun showing the lens protective device open.

Referring now to FIG. 1, there is shown a section of a gun 2 having scope 10 having mounted thereon a self-opening lens protective device 20. The device is shown with the gun in the firing position and protective device 20 is shown with shield or cover member 22 open. In the embodiment illustrated in FIG. 1, lens protective device 20 comprises a tubular sleeve member 24 having a first end 26 securely fastened to the front end 28 of the scope 10. In this embodiment, tubular sleeve member 24 is shown as generally cylindrical and circular in cross-section. However, other shapes such as oval or square in cross-section, and having an end 26 suitable for fastening to forward end 28 of scope 10 are contemplated within the purview of the invention. Additionally, sleeve member 24 has a bottom portion 30 and a top portion 32, with bottom portion 30 as shown in FIG. 1 being located closest to gun barrel. Top portion 32 of sleeve member 24 as shown in FIG. 1 is located furthermost from gun barrel 31. Tubular member 24 has a second or forward end 34 to which is pivotally connected a cover or shield member 22. In the embodiment shown in FIG. 1, cover member 22 is pivotally connected by a hinge 36 which permits the cover to go from a closed lens protective position to an open lens exposing position, with the latter being shown in FIG. 1.

Forward end 34 of tubular member 24 is shown in FIG. 1 having an oval configuration resulting from the tubular member being cut or formed at an angle with respect to its axis. The angle is more clearly shown in FIGS. 2 and 3. Having end 34 formed in this manner results in top portion 32 having a part 40 thereof extending forward of lower portion 30. While forward end 34 of sleeve member 24 is shown to be substantially planar with respect to edge 35, other configurations may be used. For example, a portion of edge 35 may be cut perpendicular with respect to the axis of sleeve member 24 and then the remainder of the edge may be cut at the desired angle. In such an instance, cover member 22 would not be substantially flat as shown in FIG. 1, but would be formed to follow the contour of edge 35 so as to provide a seal therewith sufficient to keep the lens protected.

Figure 2:
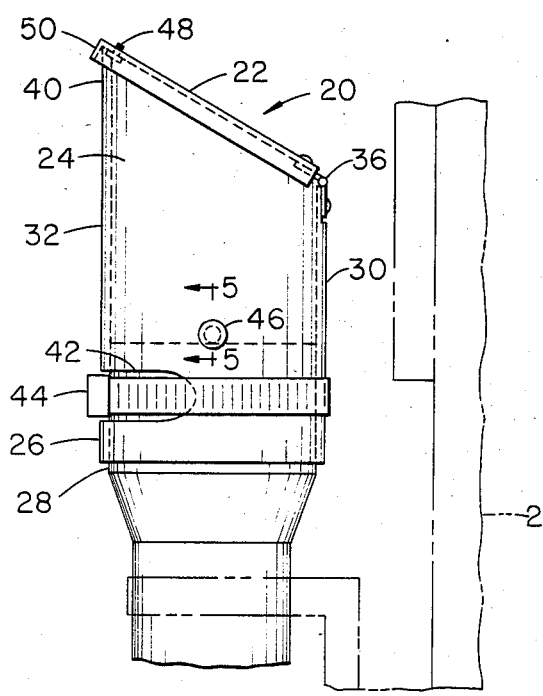
FIG. 2 is a close-up view of the protective device in the closed position mounted on a scope.
Figure 3:
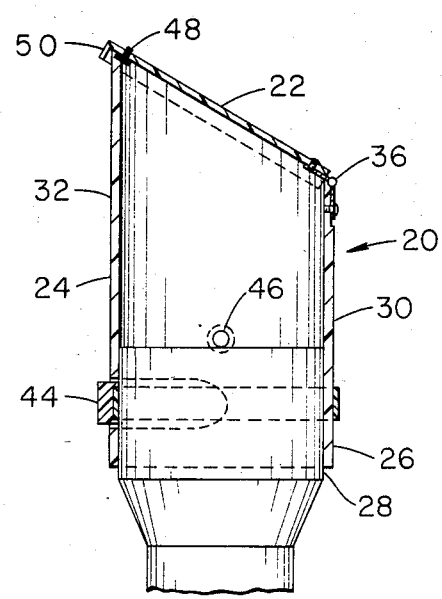
FIG. 3 is a cross-sectional view of the protective device in the closed position mounted on a scope.

Referring further to FIG. 2, it will be seen that shield member 22 is in the closed position when the gun is carried approximate the upright or vertical position. Further, it will be seen particularly from FIGS. 2 and 3 that the lens protective device can be mounted securely to a standard scope. In FIGS. 2 and 3 it can be seen that end 26 may be fabricated to slip over forward end 28 of scope 10. A slotted opening 42 may be made in tubular member 24 near first end 26 and the lens protective device may be securely fastened to the scope by means of a strap 44 without fear of damaging the scope casing.

Figure 5:
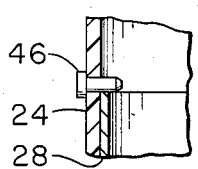
FIG. 5 is a cross-sectional view of a stopper along the line 5—5 of FIG. 2.

For ease of mounting or sliding and positioning the lens protective device 20 on to the forward end of scope 10, stoppers 46 (FIG. 5) are provided to ensure proper location of the protective device on the scope. That is, stoppers 46 ensure against over extending of the forward end of the scope into the tubular member and interfering with the opening and closing of cover 22 (See FIGS. 2 and 3). Strap 44 may be suitably protected from foreign material by means of protective cover (not shown).

In FIGS. 2 and 3, cover 22 is shown with a collar 50 to further seal the scope lens from rain, etc. Also shown in FIGS. 2 and 3 is a cover rest 48, preferably fabricated from a rubberous material to deaden any noise that may occur as cover 22 goes from a closed lens protective position to an open lens exposing position.

Figure 4:
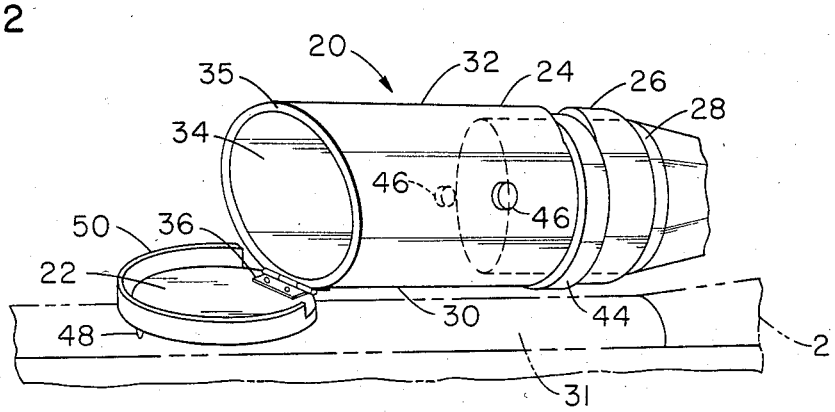
FIG. 4 is a perspective view of the protective device with the shield in the open position.

FIG. 4 shows a close-up view of the lens protective device with cover 22 having collar 46 in the lens exposed position or firing position. It will be noted that collar must not extend above cover 22 to an extent which would interfer with sighting through the scope or with releasing the shield from tubular member 24.

The lens protective device of the present invention is self-opening on bringing the gun from a position approximate the vertical to a firing position making it unnecessary for the operator to make any manual adjustments thereto before sighting through the scope. Thus, it is a preferred feature of the lens protective device to have forward end 34 fabricated so as to form an angle which can be as much as 45° and preferably 23° to 37° forward from a plane vertical to the axis of the tubular member. For example, if the forward end 34 is fabricated so as to form an angle backward from a plane vertical to the axis of the tubular member then the barrel of the gun usually has to be lowered to a point below the horizontal to open shield member 22. This is a less preferred embodiment since further motion can be required to open shield member 22.

In operation, a gun having a scope fitted with the lens protective device can be carried in a vertical position as, for example, when the gun is carried by its strap slung over the shoulder. In the vertical position, shield member 22 assumes the closed position and protects the lens against rain drops, etc. Upon bringing the gun down from the vertical to the firing position, e.g. horizontal, shield member 22 automatically opens leaving the operator free to concentrate on sighting through the scope. It will be appreciated that shield member 22 can be made to open sooner or later depending on the angle used for forward opening 34. Further, it will be understood, that part of shield member 22 may be weighted near bottom portion 30 to facilitate opening. Closing of shield member 22 can easily be accomplished by turning the gun on its side to the right or left or by lifting slightly passed the vertical with the barrel pointing upwardly which also can be facilitated by the angle chosen for forward opening 34.

While the self-opening lens protective device has been described and shown including a tubular member which can be mounted on a scope, the device may be formed as an integral part of the scope housing and such is contemplated within the purview of the invention.

While the invention has been described in terms of preferred embodiments, the claims appended hereto are intended to encompass other embodiments which fall within the spirit of the invention.

What is claimed is:

1. A self-opening lens protective device for protecting the lens of a scope mounted on a gun, the lens protective device consisting of:
   (a) a tubular sleeve member having
      (i) a first end thereof adapted for mounting on one end of said scope;
      (ii) an opposed end for mounting a cover member thereto;
      (iii) a top portion and a bottom portion, said bottom portion closest to the gun barrel and said top portion being furthermost from said gun barrel when said scope and protective device are mounted on said gun;
   (b) a cover member pivotally connected to said opposed end at said bottom portion, said cover member positioned to open at the horizontal firing position.

2. The self-opening lens protective device in accordance with claim 1 wherein said opposed end is formed to have an opening at an angle of less than 45 degrees as measured forward from a plane perpendicular to the axis of the tubular member.

3. The self-opening lens protective device in accordance with claim 1 wherein said top portion extends forward of said bottom portion when said gun is held in the horizontal position.

4. The self-opening lens protective device in accordance with claim 3 wherein the top portion and bottom portion define a plane at an angle in the range of 23 to 37 degrees from a plane perpendicular to the axis of the tubular member.

5. The self-opening lens protective device in accordance with claim 1 wherein said tubular member is substantially circular and said opposed end defines a substantially elliptical shaped opening.

6. A self-opening lens protective device for protecting the lens of a scope mounted on a gun, the lens protective device consisting of:
   (a) a cylindrical sleeve member having
      (i) a first end thereof adapted for mounting on one end of said scope;
      (ii) an opposed, elliptical shaped end for mounting a cover member thereto;
      (iii) a top portion and a bottom portion, said bottom portion closest to the gun barrel and said top portion being furthermost from said gun barrel when said scope and protective device are mounted on said gun, said top portion extending forward of the bottom portion when said gun is in a horizontal position, said opposed end formed to have an opening at an angle of less than 45 degrees as measured from a plane perpendicular to the axis of the tubular member;
   (b) a cover member pivotally mounted to said opposed end at said bottom portion, said cover member adapted to open by gravity on bringing said gun to the firing position.

7. A self-opening lens protective device for protecting the lens of a scope mounted on a gun the scope having a front end, the lens protective device consisting of:

(a) a cylindrical member extending from front end of said scope;
 (i) an elliptical shaped forward end for mounting a protective cover member thereto;
 (ii) a top portion and a bottom portion, said bottom portion closest to the gun barrel and said top portion being furthermost from said gun barrel when said scope and protective device are mounted on said gun, said top portion extending forward of the bottom portion when said gun is in a horizontal position;
(b) a cover member pivotally connected to said forward end at said bottom portion, said cover member adapted to open by gravity on bringing said gun to the firing position.

* * * * *